(12) United States Patent
Utsugi (10) Patent No.: US 8,824,832 B2
(45) Date of Patent: Sep. 2, 2014

(54) IMAGE PROCESSING APPARATUS, IMAGING APPARATUS, STORAGE MEDIUM STORING IMAGE PROCESSING PROGRAM, AND IMAGE PROCESSING METHOD

(75) Inventor: Akihiko Utsugi, Machida (JP)

(73) Assignee: Nikon Corporation, Tokyo (JP)

( * ) Notice: Subject to any disclaimer, the term of this patent is extended or adjusted under 35 U.S.C. 154(b) by 104 days.

(21) Appl. No.: 13/419,168

(22) Filed: Mar. 13, 2012

(65) Prior Publication Data

US 2012/0243801 A1    Sep. 27, 2012

(30) Foreign Application Priority Data

Mar. 22, 2011    (JP) ................................. 2011-062600

(51) Int. Cl.
| | | |
|---|---|---|
| G06K 9/40 | (2006.01) | |
| H04N 5/217 | (2011.01) | |
| H04N 1/393 | (2006.01) | |
| G06T 5/00 | (2006.01) | |
| H04N 1/409 | (2006.01) | |

(52) U.S. Cl.
CPC ............ *H04N 5/2176* (2013.01); *H04N 1/393* (2013.01); *G06T 5/002* (2013.01); *H04N 1/409* (2013.01)
USPC .......................................... 382/275; 382/264

(58) Field of Classification Search
USPC .................................... 382/275, 254, 260, 264
See application file for complete search history.

(56) References Cited

U.S. PATENT DOCUMENTS

| | | | |
|---|---|---|---|
| 6,754,398 B1 | 6/2004 | Yamada | |
| 6,937,772 B2 | 8/2005 | Gindele | |
| 8,456,544 B2 * | 6/2013 | Fukutomi et al. | ............. 348/241 |
| 2010/0141809 A1 | 6/2010 | Fukutomi et al. | |
| 2010/0182452 A1 | 7/2010 | Utsugi | |
| 2010/0182462 A1 | 7/2010 | Utsugi | |

FOREIGN PATENT DOCUMENTS

| | | |
|---|---|---|
| JP | A-2000-224421 | 11/2000 |
| JP | A-2009-049482 | 3/2009 |
| JP | A-2010-166513 | 7/2010 |
| JP | A-2010-187364 | 8/2010 |

OTHER PUBLICATIONS

Jan. 21, 2014 Office Action issued in Japanese Patent Application No. 2011-062600 (with translation).

* cited by examiner

*Primary Examiner* — Yon Couso
(74) *Attorney, Agent, or Firm* — Oliff PLC (57) ABSTRACT

An image processing apparatus includes an image reducing section generating at least one reduced image by generating a reduced pixel with reference to pixel values by each predetermined area of a target image being a process object, a noise extracting section extracting a noise component at a frequency band according to a reduction ratio of the reduced image for each reduced pixel based on the reduced image, a noise subtraction section subtracting the noise component of the reduced pixel from each of pixels at the predetermined area being referred to generate the reduced pixel, and an area smoothing section smoothing the pixels with each other at the predetermined area being referred to generate the reduced pixel based on the noise component of the reduced pixel.

8 Claims, 8 Drawing Sheets

IMAGE PROCESSING APPARATUS, IMAGING APPARATUS, STORAGE MEDIUM STORING IMAGE PROCESSING PROGRAM, AND IMAGE PROCESSING METHOD

CROSS-REFERENCE TO THE RELATED APPLICATION

This application is based upon and claims the benefit of priority from Japanese Patent Application No. 2011-062600, filed on Mar. 22, 2011, the entire contents of which are incorporated herein by reference.

BACKGROUND

1. Field

The present application relates to an image processing apparatus, an imaging apparatus, a storage medium storing an image processing program, and an image processing method.

2. Description of the Related Art

Conventionally, various technologies have been developed to reject noise overlapping on a captured image.

For example, there is a technology in which multiresolution transform processing is performed for an image, plural reduced images of which sizes are different are generated, noise at a frequency band corresponding to the size is sequentially extracted from each reduced image, and the noise of each frequency band is rejected from an original image to perform the noise rejection from the image (refer to Japanese Unexamined Patent Application Publication No. 2000-224421, and so on).

However, in the conventional technology, there are problems in which pixel values are weighted and averaged by each predetermined area to generate each pixel of the reduced image, a noise component extracted as for each pixel of the reduced image is subtracted from each pixel at a corresponding area, and therefore, effects of the noise rejection are different in accordance with positions of pixels at each area, and an image quality is deteriorated such as, for example, the above-stated multiresolution transform processing.

In consideration of the problems held by the conventional technologies, a proposition of the present application is to provide a technology capable of rejecting the noise with high accuracy without deteriorating the image quality.

SUMMARY

To solve the above-stated problems, an aspect of an image processing apparatus exemplifying the present embodiment includes an image reducing section generating at least one reduced image by generating a reduced pixel with reference to pixel values by each predetermined area of a target image which is to be processed, a noise extracting section extracting a noise component at a frequency band according to a reduction ratio of the reduced image for each reduced pixel based on the reduced image, a noise subtraction section subtracting the noise component of the reduced pixel from each of pixels at the predetermined area being referred to generate the reduced pixel, and an area smoothing section smoothing the pixels with each other at the predetermined area being referred to generate the reduced pixel based on the noise component of the reduced pixel.

The image reducing section may generate the reduced image using a plurality of different reduction ratios, and the noise extracting section may sequentially extract the noise component at the frequency band from the reduced image with a minimum reduction ratio.

The area smoothing section may strongly smooth the pixels with each other at the predetermined area as the noise component is larger.

The area smoothing section may smooth an image structure at a higher-frequency band than the frequency band of the noise component.

The area smoothing section may determine a degree of smoothing based on a comparison between a characteristic parameter representing an image structure at the predetermined area and a characteristic parameter representing strength of the noise component at the frequency band.

An aspect of an imaging apparatus exemplifying the present embodiment includes an imaging section capturing a subject image and generating an image, and the image processing apparatus according to the present embodiment.

A storage medium exemplifying the present embodiment stores an image processing program causing a computer to execute a step reading a target image which is to be processed, an image reducing step generating at least one reduced image by generating a reduced pixel with reference to pixel values by each predetermined area of the target image, a noise extracting step extracting a noise component at a frequency band according to a reduction ratio of the reduced image for each reduced pixel based on the reduced image, a noise subtraction step subtracting the noise component of the reduced pixel from each of pixels at the predetermined area being referred to generate the reduced pixel, and an area smoothing step smoothing the pixels with each other at the predetermined area being referred to generate the reduced pixel based on the noise component of the reduced pixel.

An aspect of an image processing method exemplifying the present embodiment includes an image reducing process generating at least one reduced image by generating a reduced pixel with reference to pixel values by each predetermined area of a target image which is to be processed, a noise extracting process extracting a noise component at a frequency band according to a reduction ratio of the reduced image for each reduced pixel based on the reduced image, a noise subtraction process subtracting the noise component of the reduced pixel from each of pixels at the predetermined area being referred to generate the reduced pixel, and an area smoothing process smoothing the pixels with each other at the predetermined area being referred to generate the reduced pixel based on the noise component of the reduced pixel.

According to the present embodiment, it is possible to reject the noise with high accuracy and without deteriorating the image quality.

DETAILED DESCRIPTION OF THE EMBODIMENTS

Figure 1:
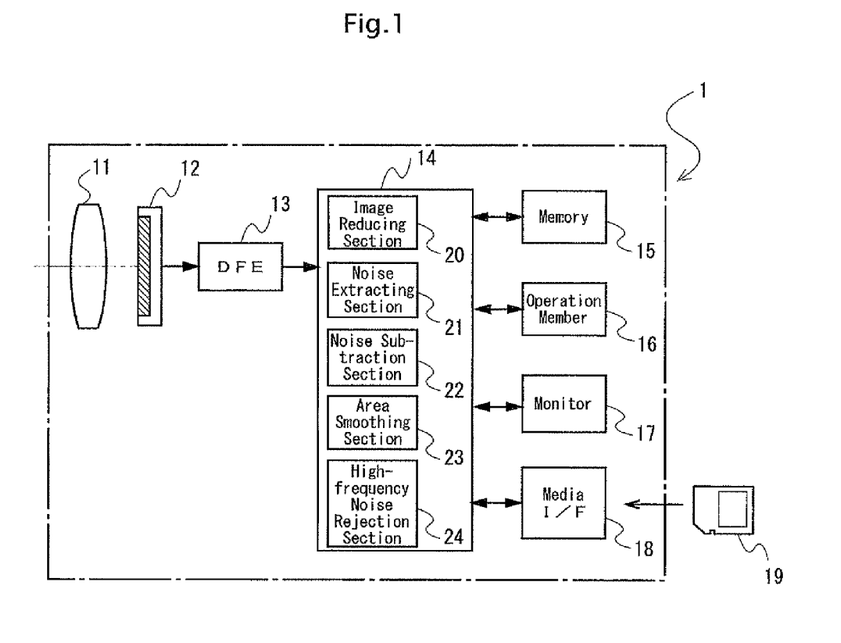
FIG. 1 is a block diagram illustrating an example of a configuration of a digital camera 1 according to an embodiment of the present application.

FIG. 1 is a block diagram illustrating an example of a configuration of a digital camera 1 according to an embodiment.

The digital camera 1 of the present embodiment includes an imaging lens 11, an image sensor 12, a DFE 13, a CPU 14, a memory 15, an operation member 16, a monitor 17, and a media I/F 18. Here, the DFE 13, the memory 15, the operation member 16, the monitor 17, the media I/F 18 are each coupled to the CPU 14.

The image sensor 12 is a device capturing a subject image image-formed by luminous flux passing through the imaging lens 11. An output of the image sensor 12 is coupled to the DFE 13. Note that the image sensor 12 of the present embodiment may be a progressive scanning type solid image sensor (such as a CCD), and an XY address type solid image sensor (such as a CMOS).

Plural light-receiving elements are arranged in a matrix state at a light-receiving surface of the image sensor 12. Color filters in red (R), green (G), and blue (B) are disposed at each light-receiving element of the image sensor 12 in accordance with a publicly-known Bayer array. Accordingly, each light-receiving element of the image sensor 12 outputs an image signal corresponding to each color by a color separation at the color filter. The image sensor 12 is thereby able to acquire a color image at an imaging time.

The DFE 13 is a digital front end circuit performing signal processing such as an A/D conversion of the image signal input from the image sensor 12 and a defect pixel correction. This DFE 13 makes up an imaging section together with the image sensor 12 in the present embodiment, and outputs the image signal input from the image sensor 12 to the CPU 14 as an image data.

The CPU 14 is a processor totally controlling each section of the digital camera 1. For example, the CPU 14 executes each of an auto-focus (AF) control by a publicly-known contrast detection, a publicly-known automatic exposure (AE) calculation, and so on. Besides, the CPU 14 performs digital processing for the image data from the DFE 13. As examples, interpolation processing, white balance processing, tone conversion processing, edge enhancement processing, color conversion processing, and so on are included in the digital processing. Further, the CPU 14 of the present embodiment operates as an image reducing section 20, a noise extracting section 21, a noise subtraction section 22, an area smoothing section 23, and a high-frequency noise rejection section 24 by executing an image processing program.

The image reducing section 20 generates a reduced image of an image (target image) captured by the image sensor 12. The image reducing section 20 of the present embodiment adds and averages pixel values by each predetermined area (hereinafter, referred to as a reduction sample range) of two pixels×two pixels for the target image by using the following expression (1), to generate a reduced image with a reduction ratio of 1/4.

$$Ys(m,n)=(Y(2m-1,2n-1)+Y(2m,2n-1)+Y(2m-1,2n)+Y(2m,2n))/4 \quad (1)$$

Here, the "Y" represents a pixel value of the target image, the "Ys" represents a pixel value of a reduced pixel (m, n) corresponding to the reduction sample range of the reduced image. The "m", the "n" are natural numbers of one to M, one to N. Note that a size of the reduction sample range is set to be two pixels×two pixels, but it is preferable to be appropriately determined in accordance with an image size of the target image, accuracy of noise rejection processing, and so on. Therefore, it is preferable to be two pixels×two pixels to five pixels×five pixels. Besides, the generation of the reduced image may be performed by using a publicly-known method such as a multiresolution analysis and a Nearest Neighbor method.

The noise extracting section 21 extracts a noise component Ns(m, n) at a frequency band in accordance with the reduction ratio of 1/4 from the reduced image by using a publicly-known method such as an epsilon filter, a morphological operation.

The noise subtraction section 22 subtracts the extracted noise component Ns(m, n) at the frequency band from the pixel value of each pixel at the reduction sample range of the target image which is referred to generate the reduced pixel (m, n) by using the following expression (2).

$$Y\_nr(2m-1,2n-1)=Y(2m-1,2n-1)-Ns(m,n) \quad (2)$$

$$Y\_nr(2m,2n-1)=Y(2m,2n-1)-Ns(m,n)$$

$$Y\_nr(2m-1,2n)=Y(2m-1,2n)-Ns(m,n)$$

$$Y\_nr(2m,2n)=Y(2m,2n)-Ns(m,n)$$

Here, the "Y_nr" represents the pixel value of the target image of which noise component Ns is rejected.

The area smoothing section 23 performs area smoothing processing to correct a difference of effects based on a later-described procedure because the effects of the subtraction processing are different in accordance with pixel positions at the reduction sample range in the target image in which the noise component Ns is subtracted by the noise subtraction section 22 as same as the conventional technology.

The high-frequency noise rejection section 24 rejects the noise component at a high-frequency band in accordance with a size of the target image in itself by applying the publicly-known method such as the epsilon filter and the morphological operation for the target image of which noise component Ns at the frequency band in accordance with the reduction ratio of 1/4 is rejected. Note that the high-frequency noise rejection section 24 may reject the noise component at the high-frequency band from the target image before the reduced image is generated, and may reject the noise component at the high-frequency band from the target image before the generation of the reduced image and after the noise component Ns at the low-frequency band is rejected.

The memory 15 is a nonvolatile flash memory storing various programs such as the image processing program executed by the CPU 14 together with the image data and so on.

The operation member 16 receives, for example, an input of a switch setting of an imaging mode, an imaging instruction of a still image and a moving image, and so on from a user.

The monitor 17 is a monitor such as a liquid crystal monitor, and displays various images according to a control command of the CPU 14. For example, the monitor 17 displays an image in accordance with the control command of the CPU 14 after the imaging and after the image processing.

A nonvolatile storage medium 19 is able to be detachably coupled to the media I/F 18. The media I/F 18 performs a read/write of data for the storage medium 19. The above-stated storage medium 19 is made up of a hard disk, a memory card housing a semiconductor memory, and so on. Note that a memory card is illustrated in FIG. 1 as an example of the storage medium 19.

Figure 2:
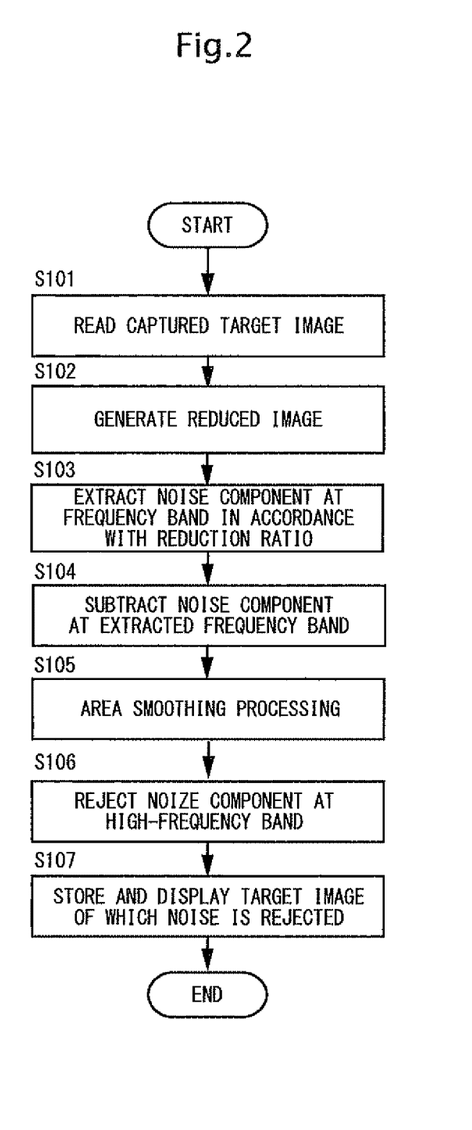
FIG. 2 is a flowchart illustrating an example of noise rejection processing by the digital camera 1 according to the embodiment.
Figure 3:
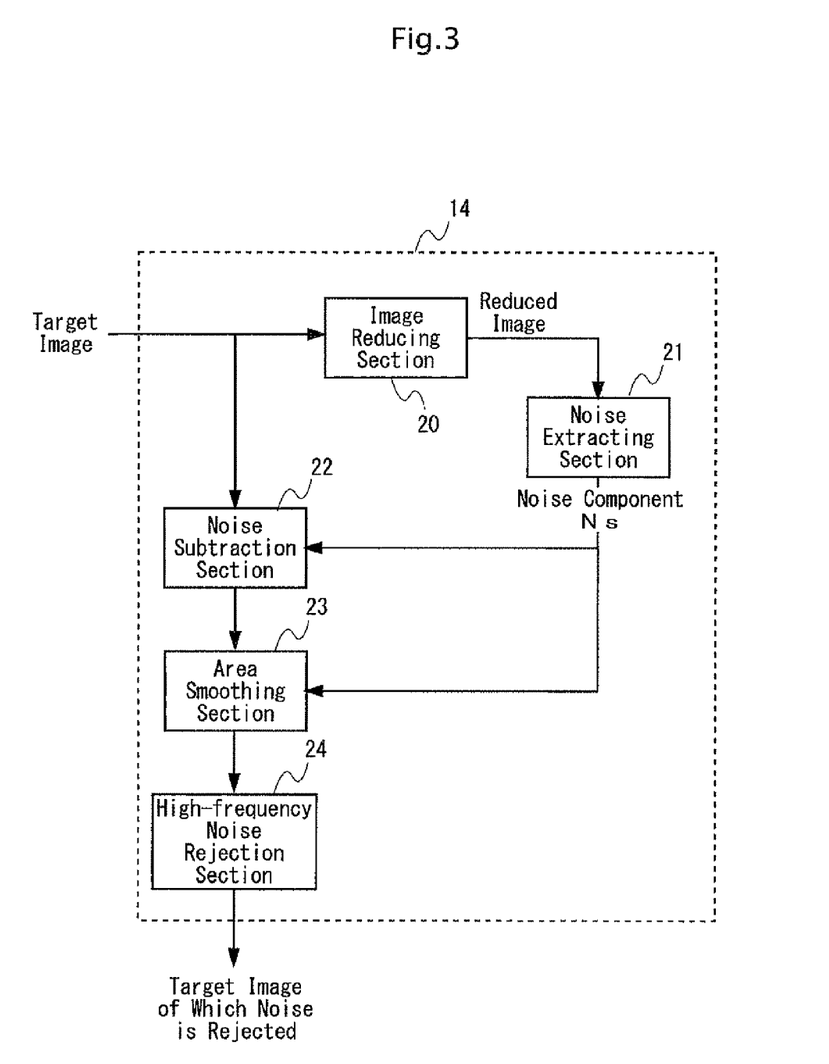
FIG. 3 is a view illustrating an example of a flow of an image data in the noise rejection processing illustrated in FIG. 2.

Next, the noise rejection processing by the digital camera 1 according to the present embodiment is described with reference to a flowchart in FIG. 2 and a flow diagram of the image data in FIG. 3. Note that FIG. 3 illustrates how the target image is processed in the image reducing section 20, the noise extracting section 21, the noise subtraction section 22, the area smoothing section 23, and the high-frequency noise rejection section 24 in the CPU 14.

The CPU 14 makes the image sensor 12 capture, for example, a still image of a subject when, for example, an imaging instruction of the still image (for example, a full-depressing operation and so on of a release button included in the operation member 16) is received from the user. The CPU 14 starts processes from step S101 for the captured still image.

Step S101: The CPU 14 reads the still image output from the image sensor 12 via the DFE 13, performs the digital processing, and sets as the target image. The CPU 14 performs the color interpolation processing being the digital processing for the target image, finds the pixel values of three color components of R, G, B at the pixel position of each pixel, further performs the color conversion processing, and converts from the pixel values of RGB into pixel values of a brightness component and a color difference component of YCrCb.

Figure 4A:
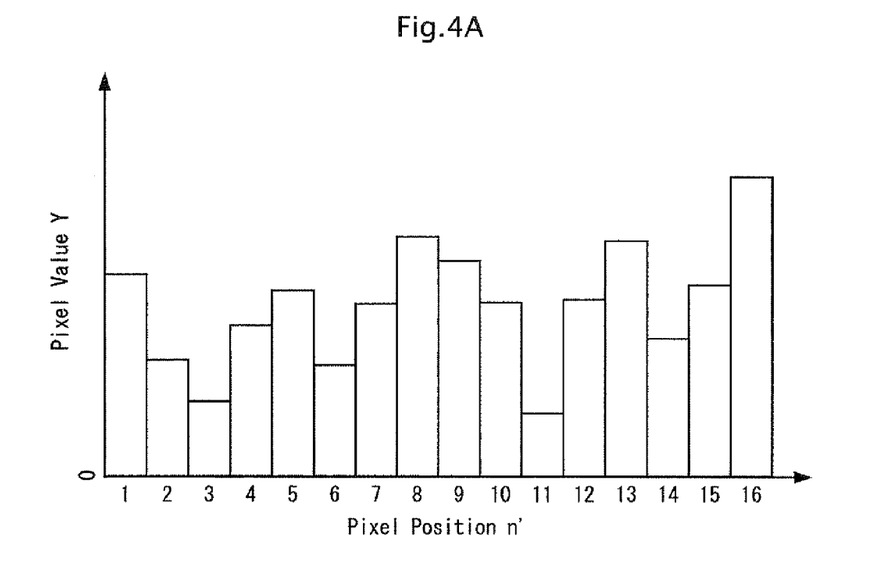
FIG. 4A is a view illustrating an example of a distribution of a pixel value of a target image.
Figure 4B:
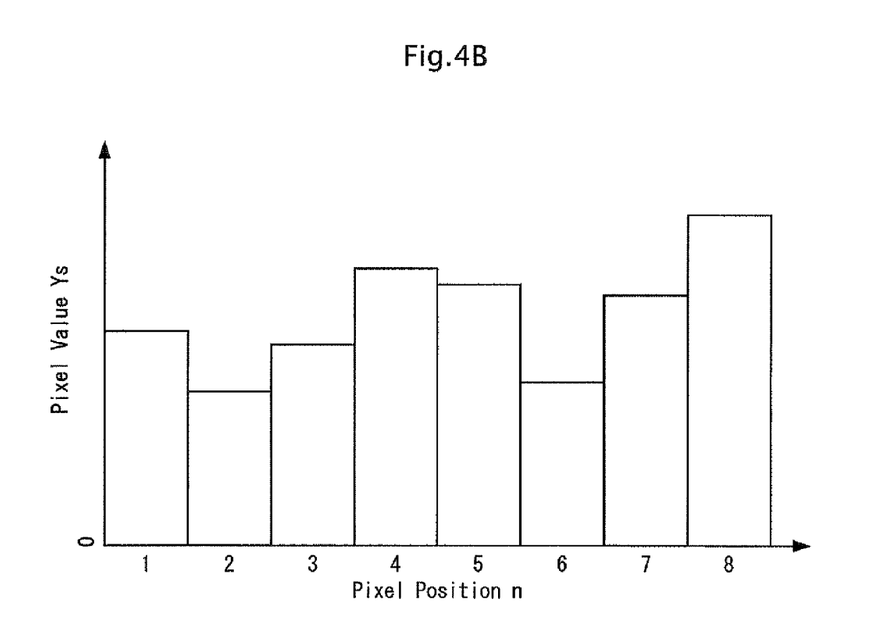
FIG. 4B is a view illustrating an example of a distribution of a pixel value of a reduced image.

Step S102: The image reducing section 20 generates the reduced image with the reduction ratio of 1/4 by using the pixel value "Y" of the brightness component of the target image and the expression (1). FIG. 4A and FIG. 4B illustrate examples of distributions of the pixel values "Y" and "Ys" in a horizontal scanning direction at a 2m-th (or 2m−1)-th line of the target image and at an m-th line of the reduced image. Note that a pixel position "n" in a vertical scanning direction of the reduced image corresponds to pixel positions "n'" and "n'+1" in the vertical scanning direction at the reduction sample range of the target image (n'=1, 3, ..., 2N−1). Note that FIG. 4A and FIG. 4B illustrate the distributions of the pixel values "Y" and "Ys" in the horizontal scanning direction, but they are also the same in the vertical scanning direction.

Figure 5:
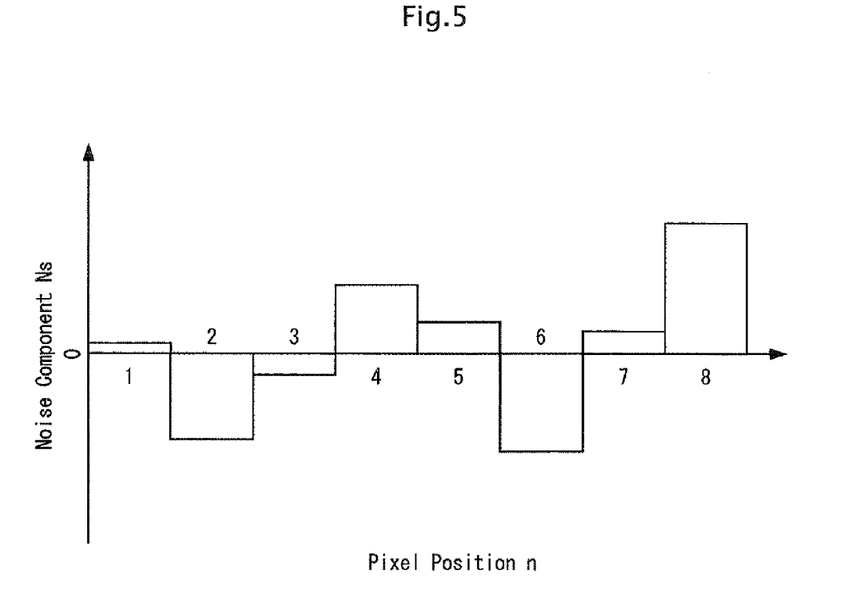
FIG. 5 is a view illustrating an example of a distribution of a noise component at a low-frequency band.

Step S103: The noise extracting section 21 extracts the noise component Ns at the frequency band with the reduction ratio of 1/4 (hereinafter, referred to as a low-frequency band) overlapping on the reduced image generated at the step S102 based on the publicly-known noise extraction processing. FIG. 5 is a view illustrating an example of a distribution of the noise component Ns at the low-frequency band in the horizontal scanning direction at the m-th line. Note that the distribution of the noise component Ns at the low-frequency band in the horizontal scanning direction is illustrated in FIG. 5, but it is also the same as in the vertical scanning direction.

Figure 6:
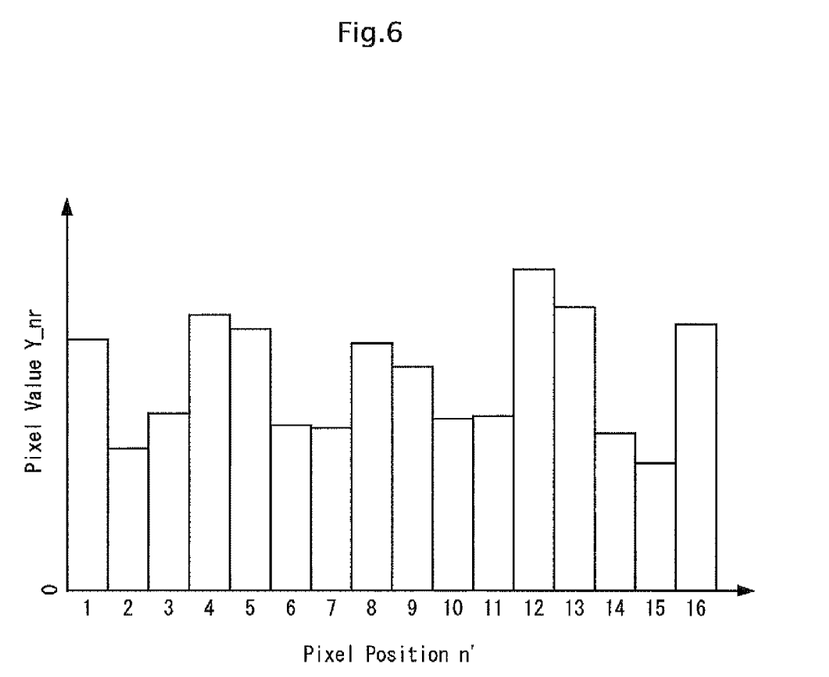
FIG. 6 is a view illustrating a distribution of a pixel value of a target image of which noise component at the low-frequency band is subtracted.

Step S104: The noise subtraction section 22 subtracts the noise component Ns at the low-frequency band of the reduced pixel (m, n) extracted at the step S103 by using the expression (2) from the pixel value of each pixel at an area of the target image which is referred to generate the reduced pixel. FIG. 6 illustrates an example of a distribution of a pixel value Y_nr in the horizontal scanning direction at the 2m-th (or 2m−1)-th line of the target image of which noise component Ns at the low-frequency band is subtracted.

Step S105: The area smoothing section 23 performs the area smoothing processing to correct the difference of the effects of the subtraction processing occurred in accordance with the pixel positions in each reduction sample range by using the noise component Ns at the low-frequency band and the pixel value Y_nr of the target image in which the subtraction processing is performed by the noise subtraction section 22. Namely, the pixel values Y_nr of the pixel positions "n'" and "n'+1" at the same reduction sample range in the target image in which the subtraction processing is performed become values in which a difference of values before the subtraction processing (FIG. 4A) is almost held as illustrated in FIG. 6. On the other hand, the pixel values of the pixel positions "n'−1" and "n'", or pixels "n'+1" and "n'+2" between adjacent reduction sample ranges become similar values. This is because an image structure in the reduction sample range is not reflected on the noise component Ns at the low-frequency band because the reduced image is generated by adding and averaging the pixel values in the reduction sample range, and the effects of the subtraction are different depending on the pixel positions. Namely, it indicates that smoothing is weak in the reduction sample range, and the smoothing is strong between the adjacent reduction sample ranges. Accordingly, the pixel values between the adjacent reduction sample ranges are seen to form a mass of block to be an unnatural image as the conventional technology. Note that FIG. 6 illustrates the distribution of the pixel value Y_nr in the horizontal scanning direction, but it is also the same in the vertical scanning direction.

The area smoothing section 23 finds a noise strength strNs by using the reduced pixel (m, n) of the reduced image and the noise component Ns of the reduced pixel at a periphery thereof by using the following expression (3).

$$\text{str}Ns = (|Ns(m,n)-Ns(m-1,n)|+|Ns(m,n)-Ns(m+1,n)|+ \\ |Ns(m,n)-Ns(m,n-1)|+|Ns(m,n)-Ns(m,n+1)|)/8 \quad (3)$$

At the same time, the area smoothing section 23 adds and averages the pixel values by each reduction sample range of the target image which is subtraction processed, and finds parameters Δ1 to Δ4 representing an image structure at a higher-frequency band than the frequency band of the noise component Ns at each pixel position by using the following expressions (4) to (5).

$$Ys\_nr = (Y\_nr(2m-1,2n-1)+Y\_nr(2m,2n-1)+Y\_nr(2m-1,2n)+Y\_nr(2m,2n))/4 \quad (4)$$

$$\Delta 1 = Y\_nr(2m-1,2n-1)-Ys\_nr \quad (5)$$

$$\Delta 2 = Y\_nr(2m,2n-1)-Ys\_nr$$

$$\Delta 3 = Y\_nr(2m-1,2n)-Ys\_nr$$

$$\Delta 4 = Y\_nr(2m,2n)-Ys\_nr$$

The area smoothing section 23 compares the noise strength strNs and the parameters Δ1 to Δ4 by using the following expression (6), and determines values of parameters Δ1_nr to Δ4_nr representing a degree of smoothing.

$$\Delta 1\_nr = \text{ABSMINUS}(\Delta 1, k \times \text{str}Ns) \quad (6)$$

$$\Delta 2\_nr = \text{ABSMINUS}(\Delta 2, k \times \text{str}Ns)$$

$$\Delta 3\_nr = \text{ABSMINUS}(\Delta 3, k \times \text{str}Ns)$$

$$\Delta 4\_nr = \text{ABSMINUS}(\Delta 4, k \times \text{str}Ns)$$

Here, the "ABSMINUS(d, s)" is a function represented by the following expression (7) reducing an absolute value of "d" for "s" (≥"0" (zero)).

$$ABSMINUS(d, s) = \begin{cases} 0 & \text{if } (|d| \leq s) \\ d-s & \text{if } (d > s) \\ d+s & \text{if } (d < -s) \end{cases} \quad (7)$$

Note that the "k" is an adjustment parameter, and it is set to be approximately one in the present embodiment.

The area smoothing section 23 smoothes the image structure at the high-frequency band in the reduction sample range by using the following expression (8), and calculates a pixel value $Y\_nr2$ of the target image in which the difference of the effects of the subtraction processing is corrected.

$$Y\_nr2(2m-1,2n-1) = Ys\_nr + \Delta 1\_nr \quad (8)$$

$$Y\_nr2(2m,2n-1) = Ys\_nr + \Delta 2\_nr$$

$$Y\_nr2(2m-1,2n) = Ys\_nr + \Delta 3\_nr$$

$$Y\_nr2(2m,2n) = Ys\_nr + \Delta 4\_nr$$

Here, the expression (8) strongly smoothes the pixels with each other in the reduction sample range as the noise component Ns is larger.

Figure 7:
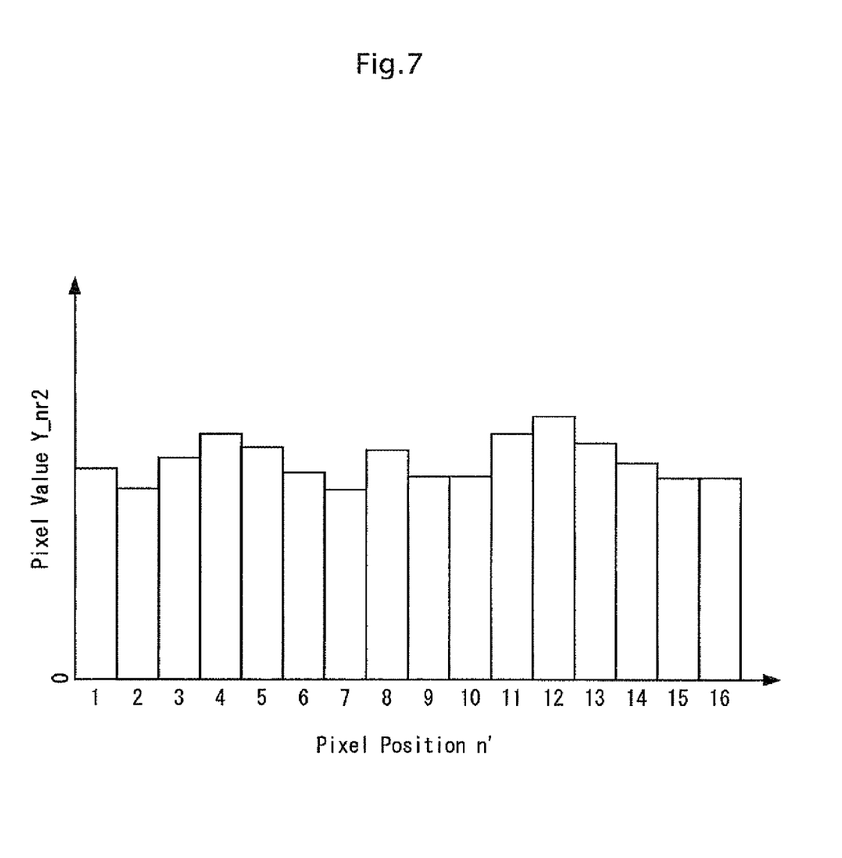
FIG. 7 is a view illustrating a distribution of the pixel value of the target image of which noise component at the low-frequency band is rejected by area smoothing processing.

FIG. 7 illustrates an example of a distribution of the pixel value $Y\_nr2$ in the horizontal scanning direction at a 2m-th (or 2m−1)-th line of the target image to which the process by the area smoothing section 23 is performed. As illustrated in FIG. 7, blocking of the pixel values between the adjacent reduction sample ranges is solved, and an image quality is improved. Note that FIG. 7 represents the distribution of the pixel value $Y\_nr2$ in the horizontal scanning direction, but it is also the same in the vertical scanning direction.

Step S106: The high-frequency noise rejection section 24 rejects the overlapping noise component at the high-frequency band from the target image to which the area smoothing processing is performed by using the publicly-known method.

Step S107: The CPU 14 inverse transforms the pixel value of the target image of which noise components at the low-frequency band and the high-frequency band are rejected into the pixel value of RGB, and stores at the memory 15 and the storage medium 19. Besides, the CPU 14 displays the target image which is noise rejected on the monitor 17. The CPU 14 finishes a series of processes.

As stated above, the noise component Ns at the low-frequency band overlapping on the target image is rejected in consideration of the image structure at the higher-frequency band than the noise component Ns at the low-frequency band in each reduction sample range of the target image, and thereby, it is possible to reject the noise at the target image with high accuracy and without deteriorating the image quality in the present embodiment.

<<Supplementary Items to the Embodiment>>

(1) In the above-stated embodiment, the example is described in which the CPU 14 enables the respective processes of the image reducing section 20, the noise extracting section 21, the noise subtraction section 22, the area smoothing section 23, and the high-frequency noise rejection section 24 of the digital camera 1 by means of software, but it goes without saying that these respective processes may be enabled by using an ASIC by means of hardware.

(2) The image processing apparatus of the present invention is not limited to the example of the digital camera 1 of the above-stated embodiment. For example, the captured image is read into a computer directly or via Internet and so on from the digital camera 1, the image processing program of the noise rejection processing stored at the storage medium such as a CD-ROM is executed by the computer, and thereby, the computer may be functioned as the image processing apparatus of the present invention.

(3) In the above-stated embodiment, the still image is used as the target image, but the present invention is not limited thereto. For example, the present invention is able to be applied to a moving image, a low-resolution image (through image) for composition verification, and so on.

(4) In the above-stated embodiment, the CPU 14 performs the color interpolation processing for the captured image, and an image having the pixel values of the three color components of R, G, B at the pixel position of each pixel is set to be the target image, but the present invention is not limited thereto. For example, the present invention may be applied for a RAW image. In this case, it is preferable that, for example, the image data is generated by each color component to perform the noise rejection processing.

(5) In the above-stated embodiment, the image reducing section 20 generates only the reduced image with the reduction ratio of 1/4, but the present invention is not limited thereto, and plural reduced images of which reduction ratios are different may be generated. Note that when the plural reduced images are generated, each reduced image has the noise component at the lower-frequency band held by the reduced image of which reduction ratio is smaller under an overlapped state together with the noise component at the frequency band in accordance with the reduction ratio of the reduced image in itself. Accordingly, it is preferable to sequentially reject the noise from the reduced image of which reduction ratio is the smallest to effectively extract the noise component at the frequency band corresponding to the reduction ratio of itself from each reduced image.

Figure 8:
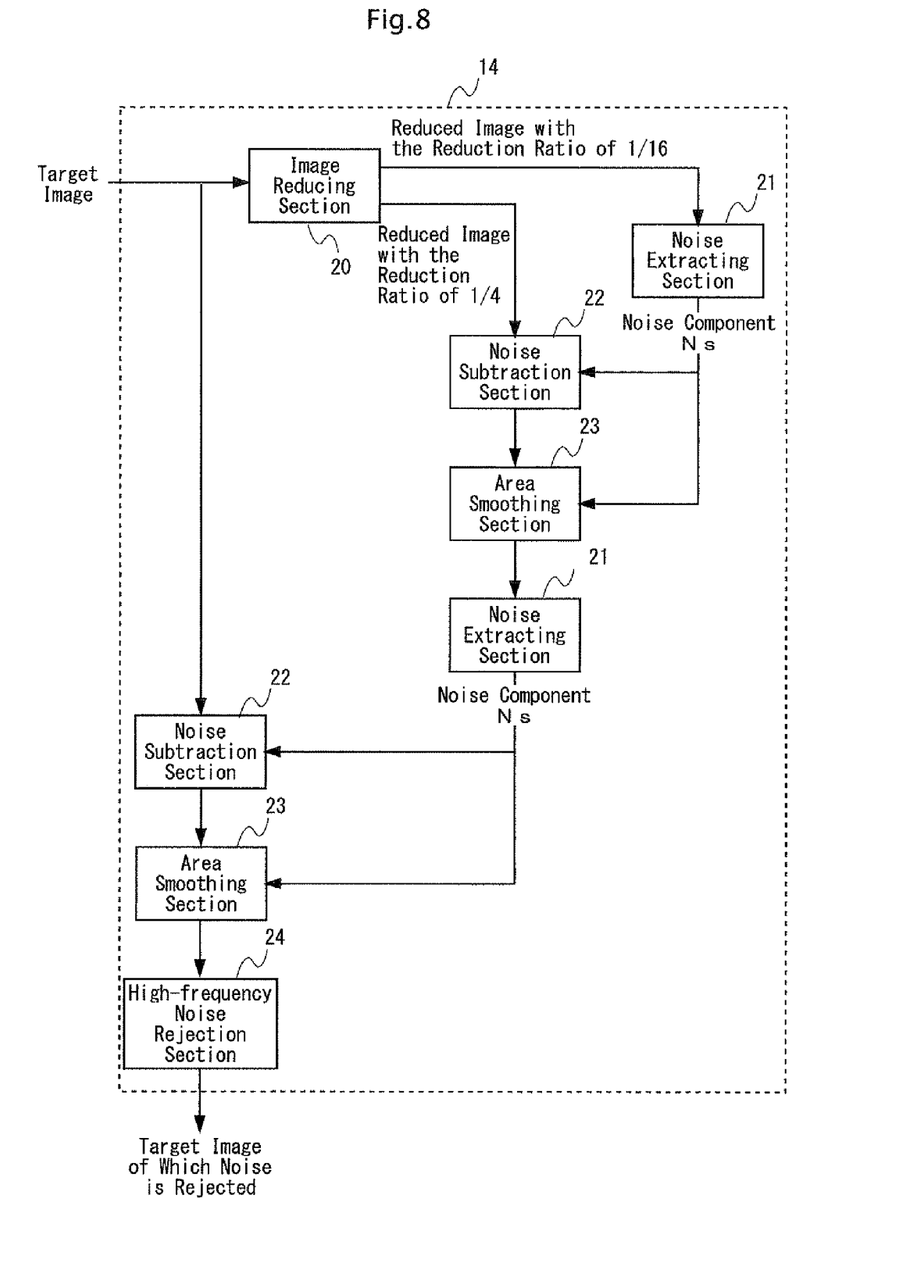
FIG. 8 is a view illustrating another example of a flow of an image data of the noise rejection processing by the digital camera 1.

FIG. 8 illustrates an example of a flow diagram of an image data when the image reducing section 20 generates the reduced images of which reduction ratios are 1/4 and 1/16. Namely, the CPU 14 at first performs the processes corresponding to the step S103 to the step S105 illustrated in FIG. 2 while setting the reduced image with the reduction ratio of 1/4 as the target image, then the noise component at the frequency band in accordance with the reduction ratio of 1/16 is rejected from the reduced image with the reduction ratio of 1/4. Next, the CPU 14 performs the processes corresponding to the step S103 to the step S107 illustrated in FIG. 2 while using the target image being an original image and the reduced image with the reduction ratio of 1/4 in which the noise component at the frequency band in accordance with the reduction ratio of 1/16 is rejected to reject the noise components at all frequency bands from the target image. It is thereby possible to reject the noise with higher accuracy without deteriorating the image quality.

Note that the number of reduced images generated by the image reducing section 20 is preferable to be determined in accordance with sizes of the target image and the reduction sample range, a size of the noise component to be rejected, an accuracy of the noise rejection processing, and so on.

(6) In the above-sated embodiment, the noise strength strNs is defined as the expression (3), but the present invention is not limited thereto. It is preferable that the noise strength strNs is arbitrary defined in accordance with the sizes of the target image and the reduction sample range, the required process speed and accuracy, and so on such as "the noise strength "strNs=|Ns(m, n)|"".

(7) In the above-stated embodiment, the area smoothing section 23 adds and averages the pixel values in the reduction sample area by using the expression (4) to determine the parameters Δ1_nr to Δ4_nr, but the present invention is not limited thereto. The pixel values may be weighted to be added and averaged in accordance with strength of the rejection effect of the noise component at the frequency band in accordance with the reduction ratio.

(8) In the above-stated embodiment, the process by the area smoothing section 23 is performed after the subtraction processing by the noise subtraction section 22, but the present invention is not limited thereto. The subtraction processing by the noise subtraction section 22 may be performed after the process by the area smoothing section 23 is performed.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing apparatus, comprising:
    an image reducing section generating at least one reduced image by generating a reduced pixel with reference to pixel values by each predetermined area of a target image which is to be processed;
    a noise extracting section extracting a noise component at a low frequency band according to a reduction ratio of the reduced image for each reduced pixel based on the reduced image;
    a noise subtraction section subtracting the noise component of the low frequency band of the reduced pixel from each of pixels at the predetermined area being referred to generate the reduced pixel; and
    an area smoothing section smoothing the pixels with each other at the predetermined area by a degree of smoothing according to a comparison between a strength of the noise component of the low frequency band of the reduced pixel and an image structure at the predetermined area from which the noise component is subtracted.

2. The image processing apparatus according to claim 1, wherein:
    the image reducing section generates the reduced image using a plurality of different reduction ratios; and
    the noise extracting section sequentially extracts the noise component at the low frequency band from the reduced image with a minimum reduction ratio.

3. The image processing apparatus according to claim 1, wherein
    the area smoothing section strongly smoothes the pixels with each other at the predetermined area as the noise component is larger.

4. The image processing apparatus according to claim 1, wherein
    the area smoothing section smoothes an image structure at a higher-frequency band than the frequency band of the noise component.

5. An imaging apparatus, comprising:
    an imaging section capturing a subject image and generating an image; and
    the image processing apparatus according to claim 1.

6. A non-transitory storage medium storing an image processing program causing a computer to execute:
    reading a target image which is to be processed;
    generating at least one reduced image by generating a reduced pixel with reference to pixel values by each predetermined area of the target image;
    extracting a noise component at a low frequency band according to a reduction ratio of the reduced image for each reduced pixel based on the reduced image;
    subtracting the noise component of the reduced pixel from each of pixels at the predetermined area being referred to generate the reduced pixel; and
    smoothing the pixels with each other at the predetermined area by a degree of smoothing according to a comparison between a strength of the noise component of the low frequency band of the reduced pixel and an image structure at the predetermined area from which the noise component is subtracted.

7. An image processing method, comprising:
    generating, with a computer processor, at least one reduced image by generating a reduced pixel with reference to pixel values by each predetermined area of a target image which is to be processed;
    extracting, with the computer processor, a noise component at a low frequency band according to a reduction ratio of the reduced image for each reduced pixel based on the reduced image;
    subtracting, with the computer processor, the noise component of the reduced pixel from each of pixels at the predetermined area being referred to generate the reduced pixel; and
    smoothing, with the computer processor, the pixels with each other at the predetermined area by a degree of smoothing according to a comparison between a strength of the noise component of the low frequency band of the reduced pixel and an image structure at the predetermined area from which the noise component is subtracted.

8. An image processing method, comprising:
    generating with an image reducing section of a computer processor at least one reduced image by generating a reduced pixel with reference to pixel values by each predetermined area of a target image which is to be processed;
    extracting with a noise extracting section of the computer processor a noise component at a low frequency band according to a reduction ratio of the reduced image for each reduced pixel based on the reduced image;
    subtracting with a noise subtraction section of the computer processor the noise component of the reduced pixel from each of pixels at the predetermined area being referred to generate the reduced pixel; and
    smoothing with an area smoothing section of the computer processor the pixels with each other at the predetermined area by a degree of smoothing according to a comparison between a strength of the noise component of the low frequency band of the reduced pixel and an image structure at the predetermined area from which the noise component is subtracted.

* * * * *